United States Patent
Saxberg et al.

(10) Patent No.: US 11,248,147 B2
(45) Date of Patent: Feb. 15, 2022

(54) WASH-OFF LABEL, A COMBINATION OF A WASH-OFF LABEL AND AN ITEM

(71) Applicant: UPM RAFLATAC OY, Tampere (FI)

(72) Inventors: Tom Saxberg, Tampere (FI); Sami Kivinen, Pirkkala (FI)

(73) Assignee: UPM RAFLATAC OY, Tampere (FI)

( * ) Notice: Subject to any disclaimer, the term of this patent is extended or adjusted under 35 U.S.C. 154(b) by 545 days.

(21) Appl. No.: 15/320,340

(22) PCT Filed: Jun. 24, 2014

(86) PCT No.: PCT/FI2014/050509
§ 371 (c)(1),
(2) Date: Dec. 20, 2016

(87) PCT Pub. No.: WO2015/197905
PCT Pub. Date: Dec. 30, 2015

(65) Prior Publication Data
US 2017/0158917 A1    Jun. 8, 2017

(51) Int. Cl.
*C09J 7/30* (2018.01)
*C09J 133/08* (2006.01)
(Continued)

(52) U.S. Cl.
CPC ............... *C09J 7/385* (2018.01); *C09J 4/00* (2013.01); *C09J 133/08* (2013.01); *G09F 3/10* (2013.01);
(Continued)

(58) Field of Classification Search
CPC .... C09J 7/385; C09J 133/08; C09J 2301/416; C09J 2203/334; G09F 3/10;
(Continued)

(56) References Cited

U.S. PATENT DOCUMENTS 5,616,670 A * 4/1997 Bennett .................. C09J 133/08
526/307.7
5,874,143 A * 2/1999 Peloquin ................ C09J 133/08
428/40.1

(Continued)

FOREIGN PATENT DOCUMENTS

WO         9731076 A1      8/1997
WO      2013006665 A1      1/2013

OTHER PUBLICATIONS

Hercules, Inc., "Foral 85 Synthetic Resin Product Data", 2007 (Year: 2007).*

(Continued)

*Primary Examiner* — Lee E Sanderson
*Assistant Examiner* — Michael C Romanowski
(74) *Attorney, Agent, or Firm* — Cantor Colburn LLP

(57) ABSTRACT

The invention relates to a wash-off label structure and an adhesive layer comprising a pressure sensitive hot melt adhesive layer sensitive to the washing conditions. According to an embodiment the adhesive layer comprises an acrylate composition curable with ultraviolet radiation and at least one modifier selected from a tackifier, a plasticizer and a filler, and wherein the peel adhesion from the labelled surface at 50-80° C. in alkaline aqueous solution of at least 30% less than the peel adhesion at room temperature of 23° C.±2° C. and relative humidity of 50%±5%. The invention further relates to a use of the label for recyclable or reusable packages, and a combination of a package and a wash-off label.

10 Claims, 2 Drawing Sheets

(51) Int. Cl.
*G09F 3/10* (2006.01)
*C09J 7/38* (2018.01)
*C09J 4/00* (2006.01)
*G09F 3/02* (2006.01)
*C08K 3/00* (2018.01)

(52) U.S. Cl.
CPC ........... *C08K 3/00* (2013.01); *C09J 2203/334* (2013.01); *C09J 2301/302* (2020.08); *C09J 2301/304* (2020.08); *C09J 2301/312* (2020.08); *C09J 2301/416* (2020.08); *C09J 2400/143* (2013.01); *C09J 2423/106* (2013.01); *C09J 2433/00* (2013.01); *C09J 2467/006* (2013.01); *G09F 2003/0222* (2013.01); *G09F 2003/0241* (2013.01); *G09F 2003/0272* (2013.01); *G09F 2003/0273* (2013.01)

(58) Field of Classification Search
CPC ..... G09F 2003/0272; G09F 2003/0273; C08K 5/0016
USPC ...................................... 525/330.3
See application file for complete search history.

(56) References Cited

U.S. PATENT DOCUMENTS

| 2010/0051200 | A1 | 3/2010 | Mueller et al. |
| 2010/0143647 | A1* | 6/2010 | Tonniessen ............... B65C 9/20 428/137 |
| 2010/0285249 | A1* | 11/2010 | Mitchell ................... G09F 3/10 428/35.7 |
| 2011/0033700 | A1* | 2/2011 | Caylus ...................... G09F 3/10 428/354 |
| 2012/0048463 | A1* | 3/2012 | Cimpeanu .................. C09J 5/00 156/273.7 |
| 2015/0284596 | A1* | 10/2015 | Nakada ................... B32B 27/00 428/355 AC |

OTHER PUBLICATIONS

International Search Report dated Mar. 20, 2015; International Application No. PCT/FI2014/050509 International Filing Date Jun. 24, 2014 (4 pages).

Written Opinion dated Mar. 20, 2015; International Application No. PCT/FI2014/050509; International Filing Date Jun. 24, 2014 (7 pages).

* cited by examiner

WASH-OFF LABEL, A COMBINATION OF A WASH-OFF LABEL AND AN ITEM

CROSS-REFERENCE TO RELATED APPLICATIONS

This application is a National Stage application of PCT/FI2014/050509, filed Jun. 24, 2014, which is incorporated by reference herein in its entirety.

FIELD OF THE APPLICATION

The application concerns a wash-off label and especially an adhesive layer for labels to be washed off. Further the application concerns a combination of a wash-off label and an item.

BACKGROUND OF THE APPLICATION

It is general practice to apply a label to the surface of containers, such as bottles made of polymer or glass, to provide decoration, identification and/or information for example on the contents of the container. Plastic labels, in contrast to paper labels, are increasingly preferred, for example due to their more appealing appearance, for example transparency, and better mechanical properties. The containers, such as bottles in the beverage industry, are generally re-used or recycled and thus there is a need for plastic labels which are easily and completely removed from the surface of the container during conventional washing processes such as hot dilute caustic soda. Thus, removable labels are an important topic, for example, in beverage industry.

It would be desirable to produce wash-off labels which are economical but also environmentally friendly. Further it would be desirable that the labels are totally removable from a surface of an item without leaving deposits or remnants of adhesive on the surface of the item.

SUMMARY

It is an object of the application to provide a washable label i.e. a label to be washed off from the surface labelled. It is another object to provide labelled items comprising a said washable label.

One embodiment provides a wash-off label comprising a face layer and a pressure sensitive hot melt adhesive layer sensitive to the washing conditions applied to one surface of the face layer, wherein the pressure sensitive hot melt adhesive layer sensitive to the washing conditions comprises:
  an acrylate composition curable with ultraviolet radiation; and
  at least one of the following modifiers: a tackifier, a plasticizer and a filler, and wherein the wash-off label has the peel adhesion of the pressure-sensitive adhesive layer from the labelled surface at 50-80° C. in alkaline aqueous solution at least 30% less (lower) than the peel adhesion of the pressure-sensitive adhesive layer from the labelled surface at room temperature of 23° C.±2° C. and relative humidity of 50%±5%.

One embodiment provides use of an adhesive comprising:
an acrylate composition curable with ultraviolet radiation; and
at least one of the following modifiers: a tackifier, a plasticizer and a filler, and wherein the peel adhesion of the pressure-sensitive adhesive layer from the labelled surface at 50-80° C. in alkaline aqueous solution is at least 30° A) less than the peel adhesion at room temperature of 23° C.±2° C. and relative humidity of 50%±5% for wash-off labels.

One embodiment provides use of a wash-off label for recyclable or reusable items, such as polyethylene terephthalate bottles or glass bottles.

One embodiment provides a combination of an item and a wash-off label. The item may be a package, such as polyethylene terephthalate bottle or glass bottle. In the labelled package the face layer of the wash-off label is oriented at least in the direction extending circumferentially around the package, such as circumferentially around the bottle.

Further embodiments of the application are presented in the dependent claims.

According to an example the peel adhesion of the pressure-sensitive adhesive layer from the labelled surface at 50-80° C. in alkaline aqueous solution is 50-95% less (lower) than the peel adhesion at room temperature of 23° C.±2° C. and relative humidity of 50%±5%.

According to an example the acrylate composition curable with ultraviolet radiation comprises at least one of the following: 2-ethylhexyl acrylate (EHA) and butyl acrylate, and photoinitiator activatable with ultra violet radiation.

According to an example the tackifier comprises at least one of the following: hydrocarbon resin, rosin ester resin and rosin acid resin. In an example, the tackifier comprises at least one of the following: hydrogenated hydrocarbon resin, hydrogenated rosin ester resin and hydrogenated rosin acid resin. In an example, the tackifier comprises Ring and Ball Softening Point between 50 and 150 degrees C., when measured according to standard ASTM D6493-11.

According to an example the tackifier is at least one of the following: hydrogenated rosin ester resin and hydrogenated rosin acid resin comprising Ring and Ball Softening Point between 60 and 125 degrees C., preferably between 70 and 110 degrees C., when measured according to standard ASTM D6493-11.

According to an example the plasticizer is at least one of the following: a low molecular weight substance, liquid polymer, liquid resin and oil. In an example, the low molecular weight substance is at least one of the following: phthalate, sulfonamide, benzoate, phosphate and citrate. In an example, the liquid polymer is at least one of the following: poly n-butyl acrylate and polybutene.

According to an example the filler is at least one of the following: mineral filler and synthetic filler. In an example, the filler is at least one of the following: silica, clay, and calcium carbonate.

According to an example the adhesive layer comprises modifiers(s) as follows: 0-10 wt. % tackifier, 0-10 wt. % plasticizer, and 0-5 wt. % filler, and wherein a total amount of modifier(s) is at least 5 wt. %.

According to an example an amount of acrylate composition curable with ultraviolet radiation is between 80 and 99 wt. % and an amount of modifier(s) is between 1-20 wt. %.

According to an example the peel adhesion of the pressure-sensitive adhesive layer is less than 1 N/25 mm at 65° C., less than 0.5 N/25 mm at 65° C., or less than 0.1 N/25 mm at 65° C.

According to an example the face layer is plastic film oriented at least in one direction.

According to an example the face layer is monoaxially oriented polypropylene film.

One effect of the label according to the embodiments is enabling optimized clean removal of the label from the item in the washing process. Further effect of the label according to embodiments is decreasing problems in the washing process. For example, contamination of the washing liquid with dissolving adhesive is prevented. Preferably, the adhesive is such that under the influence of washing conditions it loses its adhesion to some degree but does not dissolve in the washing liquid. Therefore, the washing liquid does not become contaminated with the adhesive. Preferably, the adhesive detaches from the container together with the label facestock during the washing process.

DESCRIPTION OF THE DRAWINGS

In the following some examples and embodiments of the invention will be described in more detail with reference to appended drawings, in which.

DETAILED DESCRIPTION OF THE EMBODIMENTS

Figure 1:
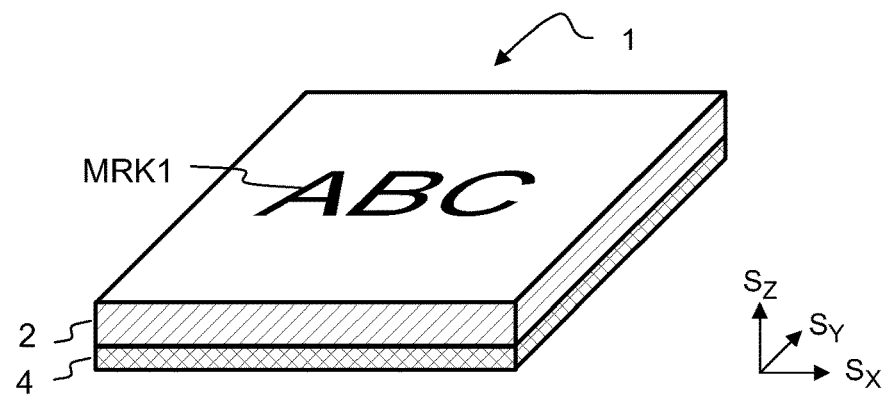
FIG. 1 shows, in a 3D view, an example embodiment of a label.

In this description and claims, the percentage values relating to an amount of raw materials are percentages by weight (wt. %) unless otherwise indicated. Word "comprising" may be used as an open term, but it also comprises the closed term "consisting of". Unit of thickness expressed as microns corresponds to μm. Unit of temperature expressed as degrees C. corresponds to ° C. The following reference numbers and denotations are used in this application:

| | |
|---|---|
| MRK1 | graphics, |
| Sx, Sy, Sz | 3D coordinates, |
| 1 | a label, |
| 2 | a face layer, |
| 4 | an adhesive layer, |
| 6 | a release liner, |
| 8 | a label laminate structure, |
| 10 | a backing material (substrate) |
| 12 | a release coating, |
| 100 | an item, |
| 101 | a labelled item. |

A label is a piece of material carrying information and to be applied onto items of different shapes and materials. In the application an item is also called as an article. An item may be a package, such as a bottle. A label comprises at least a face layer. Usually the label comprises also an adhesive layer. A label comprising pressure sensitive adhesive may be referred to as a pressure sensitive adhesive (PSA) label. Pressure sensitive adhesive labels may also be referred to as self-adhesive labels. The labels consisting of PSA can be adhered to most surfaces through an adhesive layer without the use of a secondary agent, such as a solvent, or heat to strengthen the bond. The PSA forms a bond when pressure is applied onto the label at room temperature, adhering the label to the item to be labelled. Examples of pressure sensitive adhesives include emulsion and water based PSAs, solvent based PSAs and solid PSAs. A label may further comprise other adhesive(s).

A wash-off label also referred to as a washable label refers to a label removable from the surface of the item attached during subsequent washing process.

A label laminate further comprises a release liner. The face layer and the release liner are typically laminated together having an adhesive layer in between, which laminated structure is referred to as a label laminate. The release liner is used to protect the adhesive layer but also to allow easier handling of the label to up to the point where the label face layer is dispensed and adhered to a surface of an item.

Labels may be used in wide variety of labelling applications and end-use areas, such as beverage labelling, food labelling, home and personal care product labelling, and labelling of industrial products. The surface of the labelled article may be for example plastic, glass, metal, or paper based. The labelled article may be for example a container, such as a bottle, jar, canister, can, tin or the like. The label may also be applied to semi-rigid or flexible packages used for e.g. packaging of food. Examples of articles include glass bottles, metal bottles, polyethyleneterphtalate (PET) bottles, and bottles made of polyolefin, such as high density polyethylene (HDPE) and polypropylene (PP). The label may surround the labelled article, such as a bottle, completely or partially.

Figure 2:
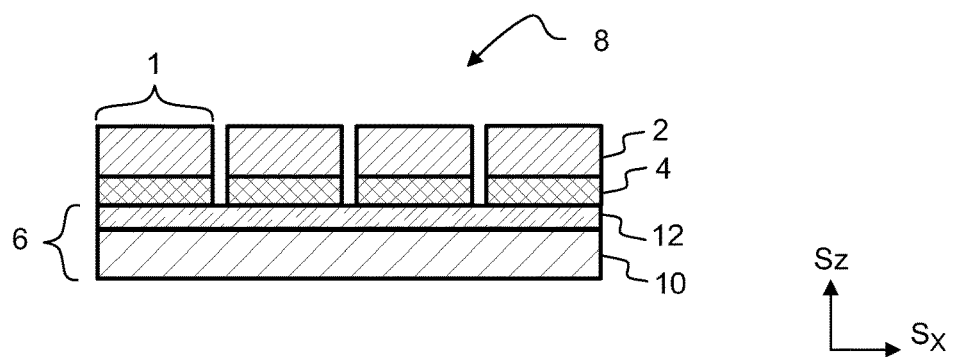
FIG. 2 shows, in a cross sectional view, cut labels attached to a common release liner.

Referring to FIG. 1 "label" 1 refers to a product that comprises a face layer 2 and an adhesive layer 4. Through the adhesive layer the label is attached to an item. Further the label typically includes graphical patterns MRK 1 on its face layer 2. During label manufacturing, continuous face layer 2 is laminated together with a release liner 6 having the adhesive layer 4 in between so as to provide a label laminate from which the individual labels can be cut. Term "label laminate" 8 refers to a continuous structure comprising a face layer 2, an adhesive layer 4 and a release liner 6. Individual labels are die-cut from the continuous label laminate. Referring to FIG. 2, a label laminate structure 8 comprises four cut labels 1 attached to a common release liner 6. During labelling the release liner 6 is removed and the label is attached onto the surface to be labelled through the adhesive layer.

Term "face layer" refers to a top layer of the label, also called as a face stock, or a face material layer. The face layer 2 is the layer that is adhered to the surface of an item 100 during labelling through an adhesive layer 4. The face layer may comprise e.g. printing in order to provide information and/or visual effect, such as information of the content of the item labelled. Printable face layer is suitable for printing by any of the known printing methods, such as with gravure, flexographic process, offset, screen or letterpress. The printing may exist on a top surface, reverse side or both top and reverse side of the face layer. A label consisting of a face layer, printing layer and an adhesive layer may be referred to as "a printed label". The face layer may have a monolayer or multilayer film structure comprising at least two layers. The multilayer structure may be co-extruded or it may comprise several layers laminated together.

Term "release liner" 6 refers to a structure comprising a backing material layer 10 as a substrate and a release coating layer 12 on a surface of the substrate, as shown in FIG. 2. In other words, the backing material 10 is usually coated with a thin layer of release agent, such as silicone. The release coating layer provides a non-adherent surface i.e. low adhesion and release effect against the adhesive layer. The release liner protects the adhesive layer during shipment and storage. It further allows for efficient handling of individual labels after the labels are die-cut and the surrounding matrix is stripped up to the point where the individual labels are dispensed on a labelling line. During dispensing the liner is peeled off and discarded.

In manufacturing a label laminate an adhesive layer 4 may be applied onto the face layer 2. Alternatively, the adhesive layer 4 may be applied onto the release liner 6. Release liner and face layer are further attached together in order to form a label laminate structure. An emulsion adhesive layer may be applied e.g. by using a curtain coating, reverse gravure, slot-die, or roller-coating methods. A hot-melt adhesive may be applied e.g. by using slot-die or roller coaters. If emulsion adhesive is used the water may be evaporated from the adhesive dispersion by using e.g. hot air jets or infra-red heaters.

An adhesive layer may be a continuous coating covering 100% of the face layer surface. Alternatively, it may be applied discontinuously as spots or strips covering less than 100% of the face layer surface. For example, the adhesive may cover between 10 to 90% of the total area of the face layer. Reduced amount of adhesive may have effect on reducing the time needed for the subsequent removal of the label during washing process from the surface of the item attached.

Term "shrinkable" refers to a property of a face layer and a label made thereof to shrink under exposure to external energy, such as heat. External energy may be provided in form of heated washing liquid.

Term "machine direction" MD refers to the running direction Sx of the face layer or continuous label lamiante during label manufacturing. "Transverse direction" TD or "cross direction" CD refers to the direction Sy perpendicular to the running direction Sx of the face layer or label lamiante.

A ratio of total film thickness before and after stretching (orientation) is called a "stretch ratio" or "stretching ratio" (DR). It may also be referred to as a an orientation ratio. Stretch ratio is a non-oriented (undrawn) film thickness in relation to the oriented (drawn) film thickness. The non-oriented film thickness is the thickness after extrusion and subsequent chilling of the film. When stretching the film, the thickness of the film may diminish in the same ratio as the film stretches or elongates. For example, a film having thickness of 100 micrometres before uniaxial orientation is stretched by a stretch ratio of 5. After the uniaxial orientation the film may have a fivefold diminished thickness of 20 micrometres. Thus, the stretch ration (orientation ratio) is 5.

FIG. 2 presents an example embodiment of a laminated label structure 8 comprising four cut labels 1 attached to a common release liner 6. The label laminate may comprise a face layer 2, a release liner 6 and an adhesive layer 4. The adhesive layer 4 is between the release layer 12 of the liner 6 and the face layer 2. Referring to FIG. 1, label structure may further comprise printing MRK1. A top surface of the face layer 2 may be printed. The printing may be subsequently top coated in order to protect the printing. Alternatively or in addition, the reverse side of the face layer adjacent to the adhesive layer 4 may be printed.

A face layer of a label may be paper based, such as coated or uncoated paper, plastic film or a combination of these. The face layer may have a monolayer structure. Alternatively, it may have a multilayer structure comprising at least two layers. The face layer may have a thickness in the range of about 10-80 μm, for example in the range of about 10-40 μm, or 10-30 μm.

The plastic face layer may comprise polymers, such as polyolefin, polyester, polystyrene, polyurethane, polyamide, poly(vinylchloride) or any combinations of these. Alternatively, plastic face may be biodegradable, such as lactic acid, starch or cellulose based. The plastic face layer may include homopolymers, copolymers or it may consists of a polymer blend. For example, the face layer may comprise mixtures of polyolefins, such as polyethylene (PE) and polypropylene (PP). In addition, the plastic face layer may comprise additives, such as pigments or inorganic fillers to provide, for example, a desired colour for the face layer. Additives may include, for example, titanium dioxide, calcium carbonate and blends thereof. The plastic face layer may also comprise minor amounts of other additives and/or film modifiers, e.g. plasticizers, stabilizers, anti-static agents, slip/anti-block agents.

The plastic face layer may be oriented (stretched) at least in one direction. The film may be stretched in a machine direction, in a transverse direction, or both. The resulting face layer is thus monoaxially (uniaxially) oriented (MO) or biaxially oriented (BO). Monoaxially oriented face layer may be machine oriented (MDO) or transverse oriented (TDO) in accordance to the direction of the orientation (stretching). Degree of orientation may be between 2 and 10 at least in one direction of the face layer.

In an embodiment, the face layer is biaxially oriented polypropylene (BOPP). In an embodiment the face layer is monoaxially in machine direction oriented polypropylene (MDO PP). In an item labelled, the face layer of the label is oriented at least monoaxially and the orientation direction of the face layer extends circumferentially around the item. For example, in FIG. 3 the orientation direction of the face layer is Sx.

Orientation direction has effect on the direction of shrinkage i.e. the shrinkable face layer primarily shrinks in the orientation direction when applying external energy. According to an example, the label is able to shrink in a direction extending circumferentially around the article. Shrinkage of the label may have effect on capability of the label to be washed off from the surface labelled.

An effect of the oriented face layer is that the stiffness of the face layer is increased. The increased stiffness will help the converting of the label for example matrix stripping process, dispensing and feeding the labels to the items to be labelled.

In one embodiment the face layer is oriented. In one embodiment the face layer non-oriented. The face layer may be mono-axially oriented or biaxially oriented. In one embodiment the face layer is oriented and annealed and therefore non-shrinkable. In one embodiment the areal shrinkage of such non-shrinkable face layer is less than 5%, for example less than 2%, at 80° C., for example in the range of 0-5% or 0.5-2.0%. In one embodiment the face layer is non-shrinkable but expandable. Expandable face layer refers to a face having an increase of at least one dimension of the face layer, for example at least one of the following thickness ($S_z$), length ($S_x$) and width ($S_y$).

In one embodiment the face layer is oriented and non-annealed i.e. not heat set and therefore shrinkable. Alternatively, the oriented face layer is annealed to a very low extent, which results in a shrinkable face layer. The face layer may be mono-axially oriented or biaxially oriented. In one embodiment the face layer comprises a shrinkable monoaxially oriented film having shrinkage in the direction of the orientation of at least 5% at 80° C., for example at least 10%. In one embodiment the face layer comprises a shrinkable monoaxially oriented film having shrinkage in the direction of the orientation in the range of 5-60% at 80° C. or in the range of 10-60% or 20-60%.

A shrinkage capability of the face layer may have effect on enabling more efficient and quick removal of the label from the surface of the item attached during washing process.

Shrinkage may be measured according to the following method: providing a sample with measured and marked 100 mm*100 mm area, placing the sample for 15 seconds to the water baths having temperatures at intervals of 5° C. from 55° C. to 98° C., cooling the sample at water bath having temperature of around room temperature, drying the sample and measuring the dimensions of the marked area of the sample. Preferably at least 3 or more parallel samples are used. Shrinkage is determined as the relative change of dimensions. The term "shrinkage" is defined with reference to the method; however, it is evident, and has been noticed, that the same shrinkage properties apply regardless of the method, provided that the same temperatures are used. I.e. the composition of heat transfer medium (air, steam, water) is not critical for shrinkage behaviour.

The face layer may be transparent or clear. From the optical point of view, high transparency of the labels may be preferred. Transparent (clear) labels are substantially transparent to visible light. Transparent no label look appearance of the label is advantageous, for example, in applications where the objects beneath the label, i.e. the surface of a bottle, should be visible through the label. Clarity of the face layer and a label comprising said face layer can be measured and evaluated by the haze values. The haze of the face layer may be lower than 25%, or lower than 10%, for example 2-6%, or 4-5%. Haze is tested according to standard ASTM D1003. When the haze of the label is low also the adhesives used should be clear or transparent.

Alternatively, opaque and/or white face layers may be used. In an embodiment of an opaque face layer, the face comprises additive to provide a desired colour. An additive may comprise one or more pigments or inorganic fillers, for example titanium dioxide, calcium carbonate and/or combination of those. In a multilayer film structure the pigment may be included in one or more of the layers. As an example, a black face layer is provided with additive carbon black. An opaque face layer may have an opacity of at least 70%, or at least 75%, or at least 80% when measured according to the standard ISO 2471. Opacity may be 70-95%, or preferably 70-80%. Alternatively, opacity may be less than 12%. measured according to the standard ISO 2471.

Figure 3:
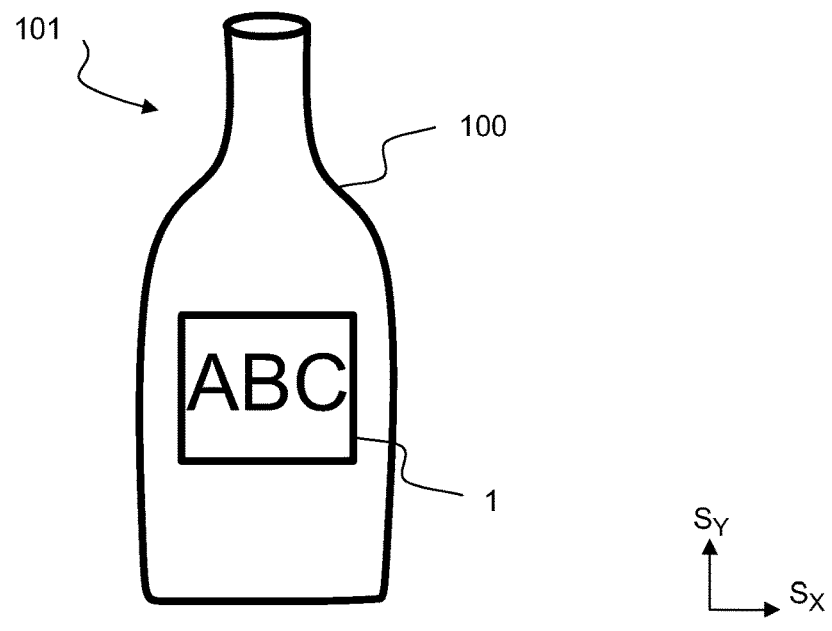
FIG. 3 shows, a label attached to an item.

Referring to FIG. 3 a label 1 can be affixed to the surface of an item (article) 100 through an adhesive layer 4 so as to form a labelled item 101. Adhesive layer provides adhesion i.e. adheres or bonds the label to the surface of the item. The adhesive layer of the label should have a suitable adhesion i.e. tack (stickiness) in order to stick to an item during labelling process. Tack is the property of adhesive that allows the immediate formation of a bond on contact with another surface. The tackiness is needed at the point the label is attached to an item. The optimum adhesion between two materials depends on, for example, the wetting and surface energy of the materials.

According to an embodiment, an adhesive layer adjacent to the surface of the item labelled comprises or consists of a pressure sensitive adhesive(s) (PSA) sensitive to washing conditions. The pressure sensitive adhesive sensitive to washing conditions reduces its adhesion (tackiness) in washing conditions. PSAs sensitive to washing conditions provide effect of immediate tack after application to the surface to be labelled without use of a secondary agent to strengthen the bond but also reduced adhesion at elevated temperatures, for example between 60 and 90° C. in alkaline solution. The adhesive layer may comprise at least one of the following: emulsion based PSA, water based PSA, solvent based PSA and solid PSA. Solid PSAs are melted during application to the surface to be coated and may also be referred to as a hot-melt PSAs.

In one embodiment the adhesive layer comprises solid PSA sensitive to washing conditions. The solid PSA may be cross linkable hot melt, such as UV curable hot melt. UV curable hot melts are applied in molten state to the surface to be coated and subsequently cured by UV light in order to form cross-linked structure. In an example PSA sensitive to washing conditions is UV curable acrylic based hot-melt adhesive.

According to an embodiment the adhesive layer comprises at least one cross-linked hot melt PSA sensitive to washing conditions. The cross-linked hot-melt PSA may be UV cross-linked PSA also referred to as UV curable PSA.

According to an embodiment the adhesive layer sensitive to washing conditions comprises a polymer composition curable with ultra violet radiation (UV). A base polymer of the UV curable PSA may be acrylate. Acrylate may be one of the following: 2-ethylhexyl acrylate (EHA) and butyl acrylate. The polymer composition curable with ultraviolet radiation further includes photoinitiator(s) i.e. ultraviolet radiation initiator. The base polymer structure e.g. the acrylate structure may include the photoinitiator(s). Alternatively, the photoinitiator(s) may be added separately to the adhesive layer composition. Photoinitiators are compounds which contain reactive groups and react to high-energy radiation, such as ultraviolet radiation, by starting the cross-linking reaction. An amount of UV curable polymer composition may be between 80 and 99 wt. %.

The adhesive layer further comprises at least one of the following modifiers: tackifier, plasticizer and filler. Total amount of modifier(s) may be between 1-20 wt. %. In an example, a filler such as mineral filler or synthetic filler is used. Filler is for example at least one of the following: silica, clay, and calcium carbonate. In an example the adhesive layer does not include surfactant(s). Surfactant may also be referred to as a surface active agent. In an example, the adhesive layer includes less than 3 wt. %, preferably less 1 wt. %, or less than 0.9 wt. % of surfactant(s). An amount of surfactant(s) may be between 0 and 3 wt. % or between 0 and 1 wt. %. An amount of less than 1 wt. % surfactant(s) may provide improved water whitening resistance of the adhesive layer.

Tackifier may be at least one of the following: hydrocarbon resin, rosin ester resin or rosin acid resin. Hydrocarbon resin may be solid aliphatic or aromatic resin. Preferably, the hydrocarbon resin is hydrogenated. Hydrogenated resin may be based on aliphatic HO comprising five carbons ($C_5$) or aromatic HO comprising nine carbons ($C_9$). In an example, tackifier is fully hydrogenated rosin ester resin. In an example a tackifier, such as hydrogenated hydrocarbon resin, hydrogenated rosin ester resin or hydrogenated rosin acid resin comprises Ring and Ball Softening Point between 50 and 150 degrees C., when measured according to standard ASTM D6493-1. In an example tackifier may be hydrogenated rosin ester resin or rosin acid resin having Ring and Ball Softening Point between 60 and 125 degrees C., preferably between 70 and 110 degrees C., when measured according to standard ASTM D6493-11. 70-110 In an example, tackifier is hydrogenated rosin ester resin or rosin acid resin having Ring and Ball Softening Point between 75 and 105 degrees C., when measured according to standard ASTM D6493-11. An amount of the tackifier may be between 0 and 10 wt. %, for example 5 wt. %. For example, the tackifier has low molecular weight, e.g. between 1000 and 4000 Da. The tackifier may have a glass transition temperature (Tg) between 40 and 50° C. Tackifier has effect on the adhesive properties of the base polymer. Tackifier may influence viscosity of the base polymer.

Plasticizer may comprise or consist of low molecular weight substances, liquid polymer, liquid resin or oil. In an example the plasticizer may be at least one of the following low molecular weight substances: phthalate, sulfonamide, benzoate, phosphate and citrate. In an example the plasticizer may be a liquid polymer of acrylate or polybutene. In an example acrylic liquid plasticizer is poly n-butyl acrylate. Poly n-butyl acrylate may have viscosity at 23 degrees C. (tested 50% in ethyl acetate) 130-200 cps. Shear rate D may be 25 s$^{-1}$, density at 20 degrees C. 1.5 g/cm$^3$ and glass transition temperature ($T_g$) –40 degrees C. An amount of the plasticizer(s) may be between 0 and 10 wt. %, for example 5 wt. %.

In one example the adhesive layer has total amount of plasticizer and tackifier at least 5 wt. %, for example between 5 and 15 wt. % or between 5 and 10 wt. %.

The modifiers may have effect on increasing softness (i.e. reduction of G" storage modulus) of the adhesive layer. The modifiers may further have effect on reducing the cross-linking density of the adhesive layer.

The adhesive layer may have a thickness in the range of about 5-40 μm, for example in the range of about 8-20 μm. The amount of the adhesive layer may be 10-20 g/m$^2$, or preferably less than 15 g/m$^2$; or more preferably less than 10 g/m$^2$.

Adhesive layer composition may have effect on reducing water whitening tendency of the layer. At least some/all embodiments have improved water whitening resistance (WWR) of the adhesive layer. Water whitening resistance is measured immersing the label in a water bath at room temperature of 23° C.±2° C. for four hours. At least some/all embodiments have effect of providing haze of the adhesive layer lower than 10%, for example 2-6%, or 4-5% even in wet conditions. Wet conditions refers to e.g. contact of the adhesive layer with water, water vapour, and/or ice. At least some/all embodiments have effect on water whitening resistance (WWR) and providing haze of the adhesive layer lower than 10%, for example 2-6%, or 4-5% when measured after immersing the label in a water bath at room temperature of 23° C.±2° C. for four hours. Haze is tested according to standard ASTM D1003.

Adhesive layer composition may also have effect on light stability of the adhesive layer e.g. reducing the tendency of the adhesive layer to become yellow. Adhesive layer composition may also have effect on preventing early and unwanted loss of tackiness of the adhesive e.g. due to the day light.

Adhesive composition may have effect on reducing the peel adhesion of the label from the surface of the item labelled when in contact with alkaline washing liquid at elevated temperatures e.g. a 1.0-2.0% solution of sodium hydroxide (NaOH) at 65-75 degrees C. Low peel strength at washing conditions may have effect of providing easy and effective separation of labels.

Adhesive composition may further have effect on retaining the cohesion of the adhesive layer so that it does not become soluble into the washing liquid and the washing liquid does not become contaminated with the adhesive.

The pressure sensitive adhesive sensitive to washing conditions means that the adhesion of the adhesive decreases at washing conditions, which generally comprise increased temperature and alkaline conditions. Preferably the adhesion of the pressure sensitive adhesive to the labelled item decreases more than the adhesion to the face layer so that the PSA remains attached to the face layer. The increased temperature may be at least 50° C., for example 65° C., 75° C. or 80° C. The alkaline conditions refer to an aqueous solution containing alkaline agent, such as NaOH, KOH or combination thereof. Probably the most common alkaline agent is sodium hydroxide NaOH, which is also called caustic soda. The alkaline liquid generally contains about 0.5-10% or 1-4% (by weight) of the alkaline agent(s), for example about 2%.

At room temperature 23° C.±2° C. and 50%±5% RH the pressure sensitive hot melt adhesive layer sensitive to the washing conditions comprising an acrylate composition curable with ultraviolet radiation; and at least one of the following modifiers: a tackifier, a plasticizer and a filler may have peel adhesion up to 25 N/25 mm, for example between 2 and 7 N/25 mm. The adhesive properties, such as adhesion force of the adhesive layer degrade or diminish when applied to the washing conditions. The peel adhesion may decrease by at least 30%, preferably by at least 90% or by at least 95% when the labelled item is subjected to washing conditions, for example 1.0-2.0% solution of sodium hydroxide (NaOH) at 65-75 degrees C. The loss in peel adhesion may provide lifting of the label from the surface of the item labelled and facilitate the ingress of the washing liquid between the adhesive and the surface of the item further enhancing the removal of the label. Peel adhesion may be lower than 1 N/25 mm at temperatures above 60 degrees C. in an alkaline washing liquid.

Peel adhesion is defined as the force required to remove a pressure sensitive adhesive label. In peel adhesion test a label is applied to a standard test plate under specific conditions and removed from the plate at a specified angle and speed according to FINAT Test Method no. 1: at angle an of 180 deg. at 300 mm/min or according to FINAT Test Method no. 2: at an angle of 90 deg. at 300 mm/min (FINAT Technical Handbook 8$^{th}$ edition, 2009). At room temperature 23° C.±2° C. and 50% RH±5% RH the peel adhesion may be up to 25 N/25 mm, when measured at an angle of 90 deg. at 300 mm/min. For example, between 2 and 10 N/25 mm, or between 3-5 N/25 mm. When subjected to washing conditions, for example alkaline washing liquid at temperature of 80° C., 75° C., 65° C. or 50° C., the peel adhesion may be for example 1-15 N/25 mm, 1-5 N/25 mm, or 0-5 N/25 mm or even lower, such as 0-2.5 N/25 mm.

At least in some embodiments reduction in adhesion force is such that a label attached with the adhesive layer to an article starts detaching from an article at an elevated temperature in alkaline water. In the washing conditions in the alkali solution the peel adhesion may be in the range of 0-1 N/25 mm, for example 0-0.5 N/25 mm, or 0-0.1 N/25 mm, even 0-0.05 N/25, or even less, such as 0-0.025 N/25 mm at 80° C., 75° C., 65° C. or 50° C.

In one embodiment the peel adhesion of the pressure sensitive adhesive is less than 1 N/25 mm at 80° C. In one embodiment the peel adhesion of the pressure sensitive adhesive is less than 1 N/25 mm at 65° C. In one embodiment the peel value of the pressure sensitive adhesive is less than 1 N/25 mm at 50° C.

In one embodiment the peel adhesion of the pressure sensitive adhesive is less than 0.5 N/25 mm at 80° C. In one embodiment the peel adhesion of the pressure sensitive adhesive is less than 0.5 N/25 mm at 65° C. In one embodiment the peel adhesion of the pressure sensitive adhesive is less than 0.5 N/25 mm at 50° C.

In one embodiment the peel adhesion of the pressure sensitive adhesive is less than 0.2 N/25 mm at 80° C. In one embodiment the peel adhesion of the pressure sensitive adhesive is less than 0.2 N/25 mm at 65° C. In one embodiment the peel adhesion of the pressure sensitive adhesive is less than 0.2 N/25 mm at 50° C.

In one embodiment the peel adhesion of the pressure sensitive adhesive is less than 0.1 N/25 mm at 80° C. In one embodiment the peel adhesion of the pressure sensitive adhesive is less than 0.1 N/25 mm at 65° C. In one embodiment the peel adhesion of the pressure sensitive adhesive is less than 0.1 N/25 mm at 50° C.

In one embodiment the peel adhesion of the pressure sensitive adhesive is less than 0.05 N/25 mm at 80° C. In one embodiment the peel adhesion of the pressure sensitive adhesive is less than 0.05 N/25 mm at 65° C. In one embodiment the peel adhesion of the pressure sensitive adhesive is less than 0.05 N/25 mm at 50° C.

In one embodiment the peel adhesion of the pressure sensitive adhesive at 80° C. is at least 30% less than the peel adhesion at room temperature of 23±2° C., 50±5% relative humidity. In one embodiment the peel adhesion at 80° C. is at least 50% less than the peel adhesion at room temperature of 23±2° C., 50±5% relative humidity. In one embodiment the peel adhesion of the pressure sensitive adhesive at 80° C. is at least 70% less than the peel adhesion at room temperature of 23±2° C., 50±5% relative humidity.

In one embodiment the pressure sensitive adhesive has a low solubility to an aqueous alkaline solution at increased temperature. In one embodiment the pressure sensitive adhesive has a solubility of less than 25% to an aqueous alkaline solution at temperature of at least 50° C. In one embodiment the pressure sensitive adhesive has a solubility of less than 25% to an aqueous alkaline solution at temperature of at least 65° C. In one embodiment the pressure sensitive adhesive has a solubility of less than 25% to an aqueous alkaline solution at temperature of at least 80° C. In one embodiment the pressure sensitive adhesive has a solubility of less than 10% to an aqueous alkaline solution at temperature of at least 50° C. In one embodiment the pressure sensitive adhesive has a solubility of less than 10% to an aqueous alkaline solution at temperature of at least 65° C. In one embodiment the pressure sensitive adhesive has a solubility of less than 10% to an aqueous alkaline solution at temperature of at least 80° C. In one embodiment the pressure sensitive adhesive has a solubility of less than 5% to an aqueous alkaline solution at temperature of at least 50° C. In one embodiment the pressure sensitive adhesive has a solubility of less than 5% to an aqueous alkaline solution at temperature of at least 65° C. In one embodiment the pressure sensitive adhesive has a solubility of less than 5% to an aqueous alkaline solution at temperature of at least 80° C.

The alkaline solution refers to a 2-4% aqueous alkaline solution, usually 1.5-2%, for example a 2% aqueous solution of NaOH.

Low solubility of the adhesive in washing conditions may have effect on preventing the contamination of the washing solution, such as aqueous alkaline solution with dissolved adhesive. This prolongs the lifetime of the washing solution and also prevents the contamination of the recyclable items, such as bottles.

A method for manufacturing a wash-off label according to embodiments may comprise at least the following steps:
providing a face stock layer,
providing a release liner,
applying a pressure sensitive hot melt acrylic adhesive layer sensitive to the washing conditions to a face stock layer or to a release liner,
curing the adhesive layer,
laminating the face stock layer and the release liner together with the adhesive layer in between so as to provide a label laminate,
cutting individual labels from the label laminate structure.

Adhesive layer may be applied to one surface of the face stock or to a release liner adjacent to the release agent layer. The hot-melt pressure-sensitive adhesive may be applied e.g. by using slot-die with or without rotating bar or roller coaters.

The adhesive layer may be applied as a continuous coating covering 100% of the face surface. Alternatively, it may be applied discontinuously as spots or strips covering less than 100% of the second surface of the face. For example, the adhesive may cover between 10 to 90% of the total area of the second surface. Reduced amount of adhesive may reduce the overall label costs. Reduced amount of adhesive may also have effect on wash-off capability of the label.

Curing of the adhesive layer comprising acrylic hot-melt PSA may be provided by using mercury lamps, such as medium pressure mercury lamp of 200 W/cm. Alternatively uv-led lamps may be used.

During labelling the individual labels are removed from the liner and attached onto the surface of the package, such as a bottle. Labelling may be provided in high speed automatic labelling lines. Bottle may be, for example polyethylene terephthalate bottle or glass bottle. In the package labelled, the face layer of the label may be oriented at least monoaxially. In an example, the face layer is oriented having shrinkage in the direction of the orientation of at least 5% at 80° C. In labelling the label may be attached onto the surface of the package so that the orientation direction of the face layer extends circumferentially around the package, such as bottle. Specific direction of the face layer may have effect on shrinking of the label during subsequent washing process for removing the label. A shrinkage capability of the face layer may have effect on enabling more efficient and quick removal of the label from the surface of the item attached during washing process.

Figure 4:
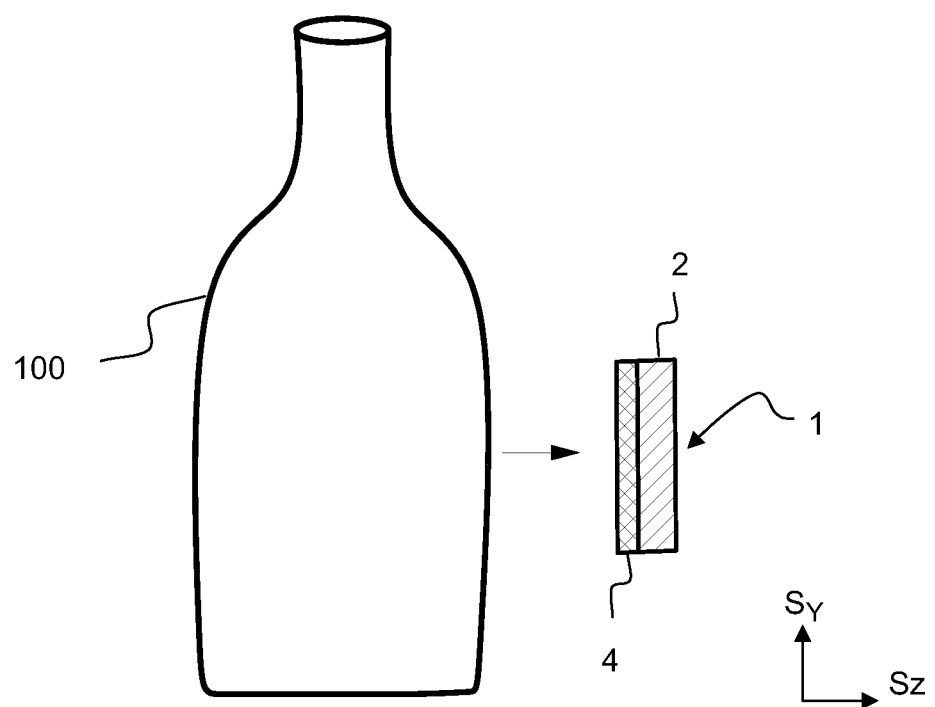
FIG. 4 shows, a label removed from the surface of an item.

Referring to FIG. 4, in the washing process the label 1 comprising pressure sensitive adhesive sensitive to the washing conditions is detached from the labelled item, for example a bottle. In washing conditions the adhesive layer 4 loses its adhesion under the influence of washing conditions to some degree enabling removal of the label from the surface of the item labelled. Preferably the adhesive layer does not dissolve in the washing liquid. Preferably the adhesive layer 4 is adhered to the face layer 2 after removal of the label 1 from the surface of an item 100.

The washing process may comprise an elevated temperature and an alkaline washing solution. Washing conditions of recyclable containers, such as glass containers, comprise temperatures in the range of 60-90° C. (degrees C.), or 65-85° C., or preferably at temperatures above 77° C. in aqueous solution. For polyester or plastic containers the washing temperature may be 65-75° C., or even higher such as about 80° C. Washing liquid usually comprises caustic soda, for example sodium hydroxide. The washing liquid may be 2-4%, preferably 1.5-2% alkaline water. During washing process the label is exposed to a washing liquid of certain temperature and the adhesive layer loses its adhesion to at least some extent. In one example the labelled items go into a pre-wash chamber at 50° C. for about one minute before they go into the washing chamber at 80° C.

Examples

Wash-off properties of labels comprising a facestock layer and an acrylic pressure sensitive hot melt adhesive layer sensitive to the washing conditions applied to one surface of the face stock were measured according to FINAT Test Method no. 26 (FINAT Technical Handbook 8$^{th}$ edition, 2009). Wash-off ability refers to the ability of an adhesive to detach itself quickly and completely in a 1.0-2.0% solution of sodium hydroxide (NaOH) at 65-75 degrees C. Due to the reduced adhesive force the label may be detached from the surface of the item labelled. In an example, the wash-off is accomplished in few minutes, like 1-3 minutes, or less than 3 minutes, or preferably less than 2 minutes.

Peel adhesion of labels facestock layer and an acrylic pressure sensitive hot melt adhesive layer sensitive to the washing conditions applied to one surface of the face stock were measured at different temperatures in an alkaline water bath using a spring scale. The tests were carried out at 50° C., 65° C. and 75° C. and were measured at angle an of 180 deg. Results are presented in a Table 1.

TABLE 1

A peel adhesion test

|  | 50° C. | 65° C. | 75° C. |
| --- | --- | --- | --- |
| Test 1/g | 19 | 10 | 3 |
| Test 2/g | 22 | 12 | 2 |
| Test 3/g | 20 | 10 | 3 |
| Average/g | 20.3 | 10.7 | 2.7 |
| Average/N/2.5 cm | 0.20 | 0.10 | 0.03 |

The embodiments described above are only example embodiments and a person skilled in the art recognizes readily that they may be combined in various ways to generate further embodiments.

The invention claimed is:

1. A wash-off label that is removable from a surface of an item during a washing process, the wash-off label comprising a face layer and a detachable adhesive layer including a pressure sensitive hot melt adhesive applied to one surface of the face layer, the pressure sensitive hot melt adhesive consisting of:
   80 to 99 wt. % of a cured acrylate composition, the cured acrylate composition formed from an ultraviolet radiation curable acrylate composition consisting of a photoinitiator activatable with ultraviolet radiation and 2-ethylhexyl acrylate (EHA), butyl acrylate, or a combination thereof;
   1-20 wt. % of a modifier consisting of:
      a tackifier having a Ring and Ball Softening Point between 60 and 125° C., measured in accordance with ASTM D6493-11, selected from the group consisting of a hydrogenated rosin ester resin, a hydrogenated rosin acid resin, and combinations thereof, and
      a plasticizer consisting of liquid poly n-butyl acrylate polymer having a viscosity of 130-200 cP at 23° C. in 50% ethyl acetate, a density of 1.5 g/cm$^3$ at 20° C., and a glass transition temperature of −40° C.; and
   0 to 10 wt. % of an optional filler selected from the group consisting of silica, clay, calcium carbonate, and combinations thereof,
   wherein the pressure sensitive hot melt adhesive has a solubility of less than 25% in a 2-4% sodium hydroxide aqueous solution at a temperature of at least 50° C.;
   where the peel adhesion of the detachable adhesive layer from a labelled polymer, glass, or metal surface at 50-80° C. in 2-4% sodium hydroxide aqueous solution is at least 30% less than the peel adhesion at room temperature of 23° C. ±2° C. and relative humidity of 50% ±5%, when measured according to FINAT Test Method No. 1 at an angle of 180° at 300 mm/min or FINAT Test Method No. 2 at an angle of 90° at 300 mm/min, so as to enable removal of the wash-off label from the labelled polymer, glass, or metal surface.

2. A wash-off label according to claim 1, wherein the peel adhesion of the detachable adhesive layer from the labelled polymer, glass, or metal surface at 50-80° C. in 2-4% sodium hydroxide aqueous solution is 50-95% less than the peel adhesion at room temperature of 23° C. ±2° C. and relative humidity of 50% ±5%.

3. A wash-off label according to claim 1, wherein the peel adhesion of the detachable adhesive layer from the labelled polymer, glass, or metal surface at 65° C. in 2-4% sodium hydroxide aqueous solution is less than 1 N/25 mm.

4. A wash-off label according to claim 1, wherein the face layer is a plastic film oriented at least in one direction.

5. A wash-off label according to claim 4, wherein the face layer is a monoaxially oriented polypropylene film.

6. A wash-off label according to claim 1, wherein the wash-off label is for labelling of a recyclable or reusable package.

7. A combination of a package and a wash-off label according to claim 1.

8. A combination of a package and a wash-off label according to claim 7, wherein the package is a polyethylene terephthalate bottle or a glass bottle.

9. A combination of a package and a wash-off label according to claim 7, wherein the face layer of the wash-off label is oriented at least in the direction extending circumferentially around the package.

10. A pressure sensitive hot melt adhesive for a detachable adhesive layer of a wash-off label that is removable from a surface of an item during a washing process, the pressure sensitive hot melt adhesive consisting of:
   80 to 99 wt. % of a cured acrylate composition, the cured acrylate composition formed from an ultraviolet radiation curable acrylate composition consisting of a photoinitiator activatable with ultraviolet radiation and 2-ethylhexyl acrylate (EHA), butyl acrylate, or a combination thereof;
   1-20 wt. % of a modifier consisting of:
      a tackifier having a Ring and Ball Softening Point between 60 and 125° C., measured in accordance with ASTM D6493-11, selected from the group consisting of a hydrogenated rosin ester resin, a hydrogenated rosin acid resin, and combinations thereof, and
      a plasticizer consisting of liquid poly n-butyl acrylate polymer having a viscosity of 130-200 cP at 23° C. in 50% ethyl acetate, a density of 1.5 g/cm$^3$ at 20° C., and a glass transition temperature of −40° C.; and
   0 to 10 wt. % of an optional filler selected from the group consisting of silica, clay, calcium carbonate, and combinations thereof,
   wherein the pressure sensitive hot melt adhesive has a solubility of less than 25% in a 2-4% sodium hydroxide aqueous solution at a temperature of at least 50° C.

* * * * *